(12) United States Patent
Chatterji

(10) Patent No.: US 10,621,440 B2
(45) Date of Patent: Apr. 14, 2020

(54) NETWORK SWITCHING APPLIANCE, PROCESS AND SYSTEM FOR PERFORMING VISUAL ANALYTICS FOR A STREAMING VIDEO

(71) Applicant: SEVENTH SENSE ARTIFICIAL INTELLIGENCE PVT LTD, Singapore (SG)

(72) Inventor: Varun Chatterji, Singapore (SG)

(73) Assignee: SEVENTH SENSE ARTIFICIAL INTELLIGENCE PRIVATE LIMITED, Singapore (SG)

( * ) Notice: Subject to any disclaimer, the term of this patent is extended or adjusted under 35 U.S.C. 154(b) by 0 days.

(21) Appl. No.: 16/431,818

(22) Filed: Jun. 5, 2019

(65) Prior Publication Data
US 2019/0377953 A1 Dec. 12, 2019

(51) Int. Cl.
*G06K 9/00* (2006.01)
*G06N 3/04* (2006.01)
(52) U.S. Cl.
CPC ..... *G06K 9/00744* (2013.01); *G06K 9/00718* (2013.01); *G06N 3/0454* (2013.01); *G06K 2009/00738* (2013.01)
(58) Field of Classification Search
CPC .................................................. G06K 9/00744
USPC ........................................................ 382/100
See application file for complete search history.

(56) References Cited

U.S. PATENT DOCUMENTS

| | | | |
|---|---|---|---|
| 9,672,251 B1* | 6/2017 | Whang | G06F 16/24575 |
| 10,284,885 B1* | 5/2019 | Borras | H04N 21/23418 |
| 2014/0049563 A1* | 2/2014 | Tobin | G06F 3/012 |
| | | | 345/649 |
| 2014/0122729 A1* | 5/2014 | Hon | H04L 67/04 |
| | | | 709/228 |
| 2018/0082137 A1* | 3/2018 | Melvin | G01S 13/931 |
| 2018/0157868 A1* | 6/2018 | Karivaradaswamy | G06F 21/78 |

\* cited by examiner

*Primary Examiner* — Stephen P Coleman
(74) *Attorney, Agent, or Firm* — Greeta Kadambi; Riddhi IP LLC

(57) ABSTRACT

The network switching appliance that receives, compresses, decompresses and analyses any raw video stream emitting from image acquiring device such as a surveillance camera using Artificial Intelligence (AI). The network switching device is a low cost, low power device that is capable of receiving a transmitted video stream, performing image detection/recognition tasks, and transmitting an annotated video stream along with meta-data attached to the specific video stream and images to understand the visual content of the video stream.

13 Claims, 11 Drawing Sheets

NETWORK SWITCHING APPLIANCE, PROCESS AND SYSTEM FOR PERFORMING VISUAL ANALYTICS FOR A STREAMING VIDEO

CROSS REFERENCE TO RELATED APPLICATION

This application claims priority to Provisional application filed in Singapore on Jun. 6, 2018, application Ser. No. 10201804794T and is incorporated in its entirety herein by reference.

FIELD OF INVENTION

The disclosure is generally directed to a network switching appliance, process and system for performing visual analytics locally for a streaming video.

BACKGROUND

Traditionally, image/object detection is relied on hand-engineered features to detect salient points/textures/shapes etc., in an image to let a machine understand the scene and the context of the object being seen in an image captured by a camera. With the advent of large datasets, and compute capabilities, it has become tractable to use machine learning to train a "model" that automatically learns how to understand images by training it on large datasets of labelled/annotated images. This general approach has led to advancements in the state of the art that allow a machine to detect anomalies in x-rays, navigate a road in a self-driving car and many more novel applications.

Even though the field of computer vision has seen several advancements at the algorithmic level through the use of novel Convolutional Neural Network (CNN) architectures, most generic algorithms are dependent on expensive hardware (typically GPUs) to run large scale operations. This has led to several large technology companies such as Google, Microsoft and Amazon providing computer vision as a service through an Application Programming Interface (API) whereby an image is transmitted over the internet, it is processed in a datacenter with sophisticated GPU hardware, and the recognition result is returned over the internet.

In the field of surveillance using fixed cameras, the use of APIs exposed over the cloud is difficult due to a few reasons:

Given the large number of megapixels in modern cameras and a high framerate of at least 30 frames per second, a very large amount of data needs to be transmitted over the cloud. This results in large bandwidth requirements which may incur a high cost or may even be impossible given existing deployed surveillance camera infrastructure.

The general purpose hardware deployed in data centers consumes a large amount of electricity. For example, a single Titan V GPU by NVIDIA can draw approximately 250 watts of electricity.

Present high-performance computing hardware such as GPUs also produce a large amount of heat which can result in sub-optimal performance in hot climates with insufficient cooling methods.

The privacy and data protection laws in certain jurisdictions may prohibit the transmission of personal data to a third party such and Amazon, Google or Microsoft for processing.

There is a need for a low cost, less computation intensive solution for image/video analysis comprising of hardware and software that addresses security, bandwidth and time constraints while being cost effective.

SUMMARY

The present invention discloses an embedded technology and edge computing capability on a low power, low cost network switching appliance (appliance) to process a video stream or an image obtained by an image capturing device via an input port and present the image matching output in a short period of time locally or to be rebroadcast via an output port. In one embodiment, the embedded system for analyzing a video stream or an image is done locally.

In one embodiment, an appliance is comprised of a hardware component that houses input connectivity capability to image streaming and capturing device, local storage device with a capability to down load annotated data in a secured manner to assigned database.

In one embodiment, a system comprises of an intelligent "switch" in the network layer that runs convolutional neural network (CNN) on the appliance/device to detect a variety of events such as identifying a person, identifying an object such as unattended baggage etc., is disclosed. In another embodiment the intelligent "switch" may be equipped with an Analog to Digital Converter and Digital to Analog Convertor, thereby making old, analog CCTV camera's smart. In another embodiment, processing of the images is done on the appliance and not on the cloud; saving bandwidth and per API call costs. In one embodiment, the appliance may generate and transmit real-time alerts for detected events. In one embodiment, the data never leaves the network to any third party server and hence presents a more secure system.

In some embodiments, the network switching appliance may be housed along with wired camera(s) or other video capturing device connected to its input ports in an integrated housing. In some embodiments, the appliance may have multiple ports (both input and output).

In another embodiment, the appliance housed along with camera(s) or other video capturing device connected to its input port(s) may be deployed on the shelf of a retail store and may be power constrained and battery operated.

In another embodiment, the appliance may use a wireless communication channel as the means of an input "port" and may use the same (or different) wireless communication channel as the means of an output "port". As a further embodiment, the results from a wireless or wired output "port" may be read by a mobile phone which may then preform some processing or communication on the results and may use its own cellular connectivity to further rebroadcast results processed on the mobile phone to an external downstream location. As a further embodiment, a body worn camera may transmit raw video stream to a wired or wireless input "port" on the appliance as a means of input.

In the present disclosure a method of using human identification (using facial recognition) to model human interactions by association to form a "social graph" is described. This method/process can lead to many embodiments that use the social graph thus constructed.

In one embodiment, the images from an image capturing device such as a camera in a meeting room may be used to construct social graphs of interactions between individuals in an organization. Once a graph is constructed, clustering algorithms may be used to determine things such as closeness of employees, group outcomes based on participation of certain members, influencers etc.

In another embodiment, a camera or other video capturing device along with the appliance could be installed in buses or along public transit stations. The image identification step could identify features such as gender, approximate age etc. The regression model could then result in a graph formation between demographic traits rather than individual identities. This could facilitate identification of how much people of different ethnicities interact with each other and be used to design social/racial integration interventions.

In a preferred embodiment of the disclosure, N models are trained such that each model generates a feature vector whereby there is a threshold $T_n$ which is the decision boundary for deciding whether two objects are of the same type given that the Euclidean distance between the feature vectors generated by the model for the two object images is less than $T_n$. Then the feature vector generated by the model for an object image can be thought of as a representation coordinate for the object. We take the representation from each model and concatenate to form one large coordinate. The concatenated coordinate from all the models represents an object in the fully combined dimensionality on the N models. This coordinate can be stored efficiently and indexed. While querying to find all objects of the same type as A, we get the representation of A by concatenating all coordinates (or feature vectors) for A from each of the N models. Then we run a distance query for all stored objects that have a distance less than:

$$\sqrt{T_1^2 + T_2^2 + \ldots + T_n^2}$$ Equation 1

Where $T_1$ to $T_n$ are the decision thresholds of models 1 to N respectively.

This reduces the storage requirements for multiple indices and also results in a single distance query for multiple models.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from accompanying the detailed description that follows.

DETAILED DESCRIPTION

Image/object detection and recognition is a field in computer vision that has been gaining interest with the proliferation of compute capability and data which allows the approach of applying Artificial Neural Networks to image recognition tasks. Unlike the cloud connected/compute intensive solutions available, the present invention makes any surveillance camera smart by using a network switching appliance (appliance) that sits between a video or image capturing device and existing surveillance infrastructure such as Network Attached Storage (NAS) or Storage Area Networks (SAN).

Figure 1:
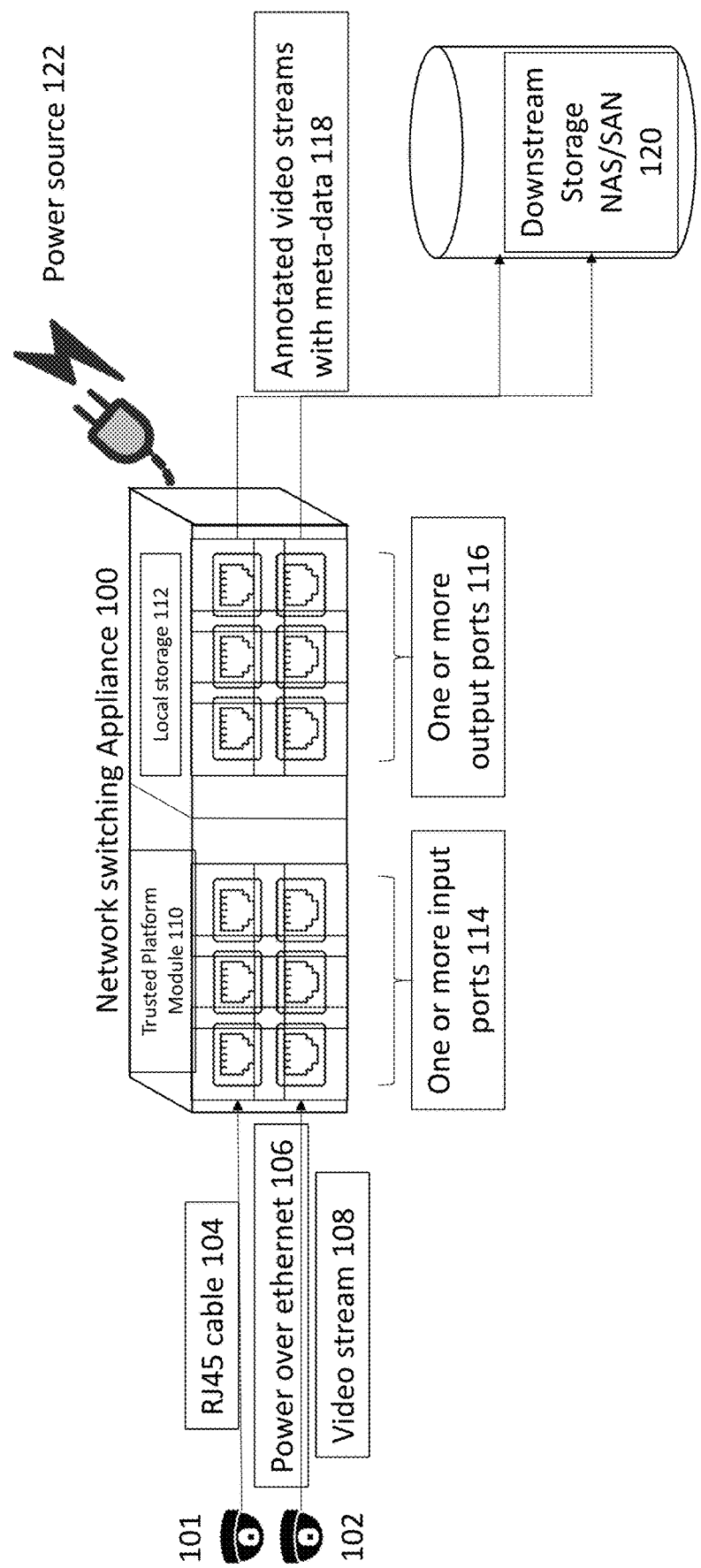
FIG. 1 shows a preferred embodiment of the network switching appliance.

FIG. 1 shows a preferred embodiment of the invention of the network switching appliance 100. An Internet Protocol (IP) camera (101) or any video streaming device 102 are connected to the network switching appliance via Gigabit Ethernet ports (114) using RJ45 cable(s) (104). The camera (s) are supplied power over ethernet (106) and transmit a video stream (108) that may be compressed/encoded using a protocol such as MJPEG or h.264. The appliance receives the video stream 108, performs object detection and matching tasks on the frames by querying a local database on the appliances local storage (112). It then rebroadcasts compressed and annotated streams with meta data via its output ports (116). The output streams that have annotated video stream with meta data (118) may then be consumed by a downstream video management system/NAS/SAN (120). The integrity of the appliance is protected by ensuring that the local storage (112) is encrypted via an encryption key which is stored on the Trusted Platform Module (110). If the device is tampered with, the encryption key cannot be retrieved from the Trusted Platform Module (TPM) (110) and the appliance will not bootup and the data in the local storage will remain encrypted with no means of retrieving the decryption key. The TPM may also lockdown and erase the key if repeated attempts are made to retrieve the key on a tampered device.

Figure 2:
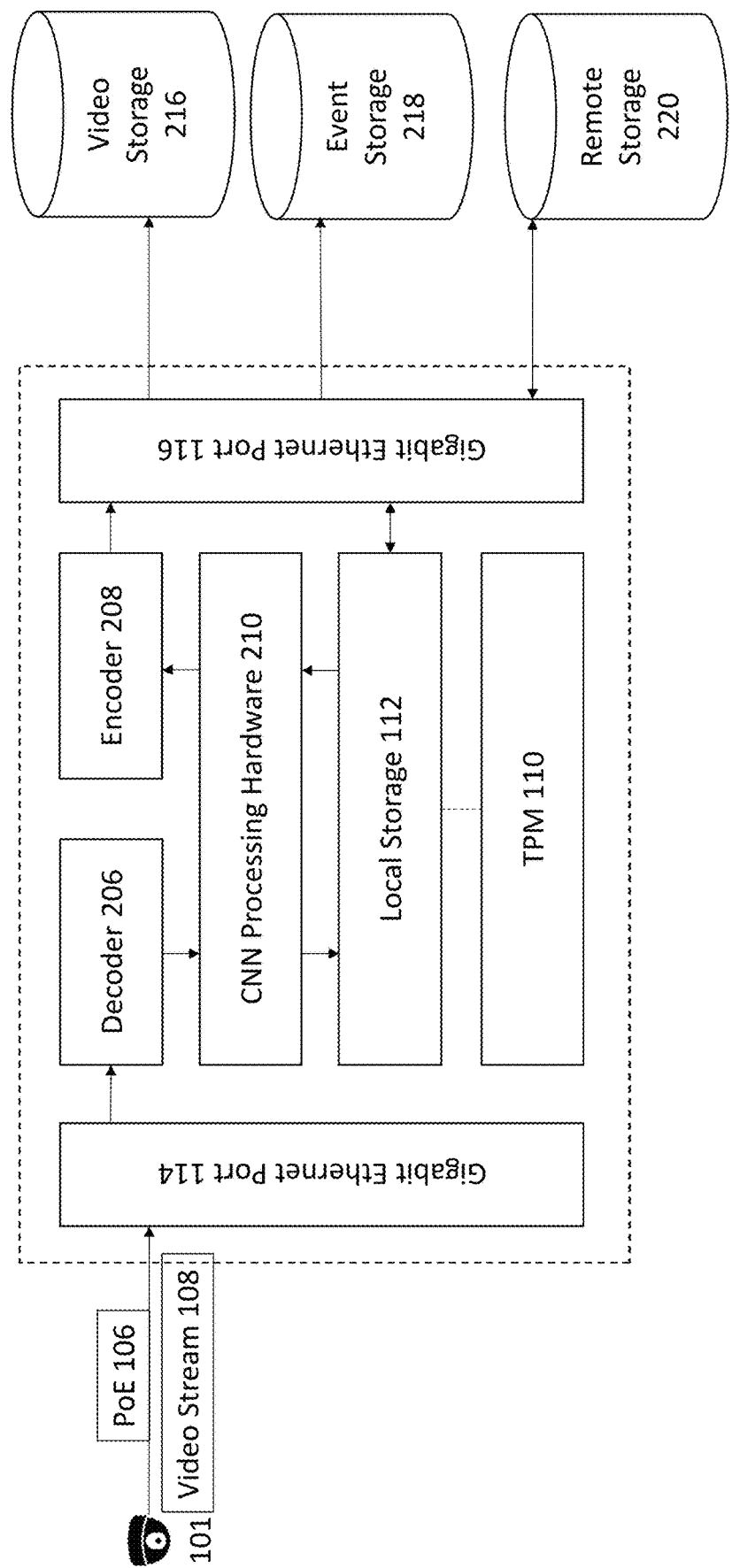
FIG. 2 shows a schematic of the various internal components of the disclosure in its preferred embodiment as a network switching appliance.

FIG. 2 shows a schematic of the internal components of the preferred embodiment presented in FIG. 1. An IP camera (101) is connected to an input port (114) of the appliance (100). The appliance 100 receives the video stream (108) and decodes it via a software or hardware decoder component (206). The decoded frame from a stream is then passed through trained CNN networks which are loaded on CNN Processing Hardware (210). The CNN Processing hardware can be any hardware that facilitates the fast computation of a forward pass of one or more Neural Networks. Some examples of such hardware are FPGAs, GPUs, Intel Myriad VPUs, etc. The process of executing a forward pass on a frame from a video stream (108) (or on regions of interest detected in the frame) generates a feature vector representing the image or regions of interest. The appliance uses these feature vectors to query its local storage (112) for a matching face or object of interest. If matches are found, the descriptions associated with the matched image on the local storage is used as metadata.

This metadata may be used to annotate the input image by drawing a box or other marker on a processed frame along with any identification information such as the name of a person/object. The processed frame is then injected to the hardware or software encoder (208) which recompresses the stream and exposes it over the output ethernet port (116). In the event of a network failure, the output stream to be transmitted via (116) may also be locally stored on the local storage (112), or, just the recognition/identification results may be stored in (112). From time to time, the appliance may sync its local storage with a remote storage via (116) or via some other communication means that may be an additional channel of communication such as WiFi/Bluetooth or any other means.

Figure 3:
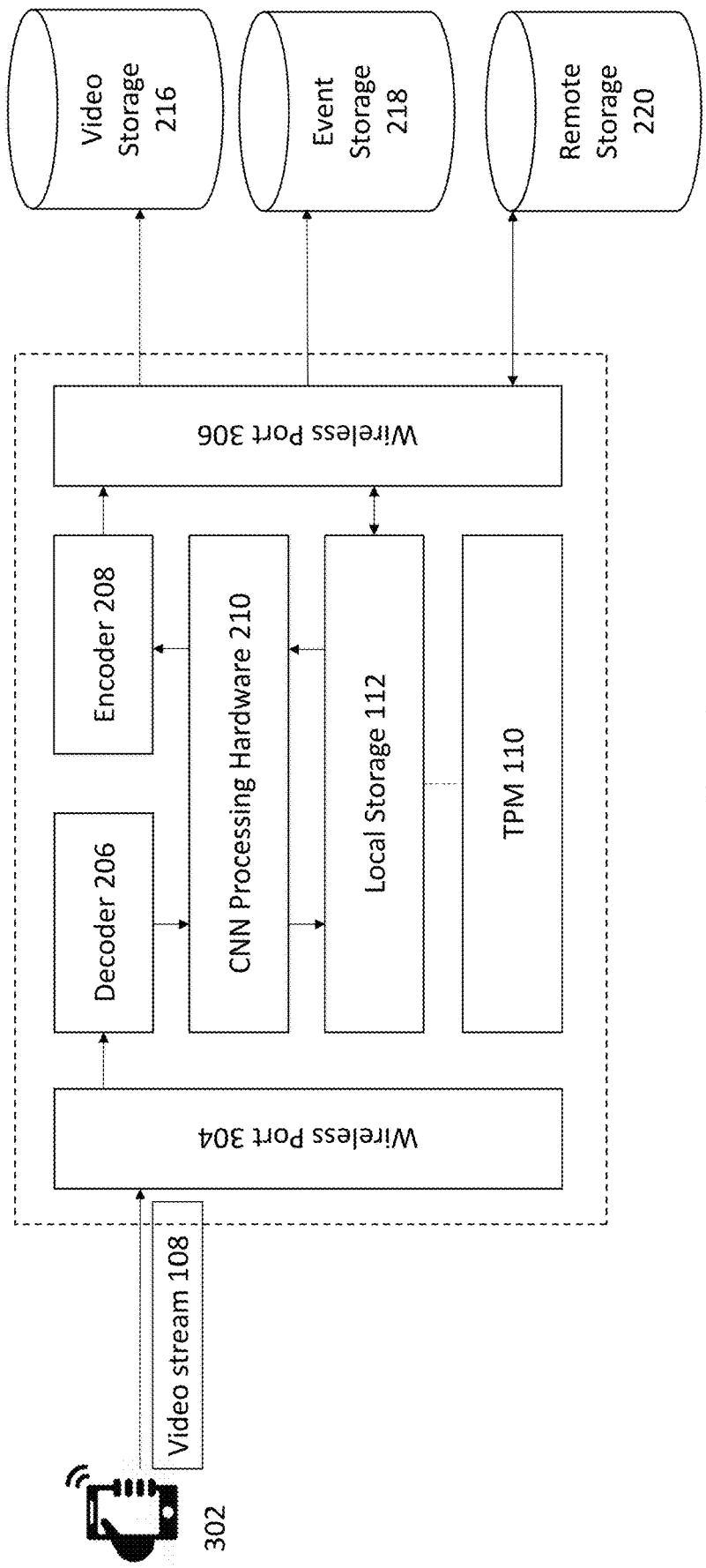
FIG. 3 shows an embodiment where the input port is a wireless channel and the camera may be a mobile device.

FIG. 3 shows a second embodiment of the invention in which the source of the video stream may be a handheld device or body worn device with a camera such as a mobile phone or a police body camera (302). In this embodiment, the present invention may be an appliance that is placed within wireless proximity of the handheld device such as inside a police car or as a body-worn appliance. Similar to the first embodiment, the stream is received via a wireless port (304) and processed via (206) and (210) and by querying a database on (112), but the results are stored on (112) instead of being immediately transmitted downstream. When the appliance is within range of another wireless communication receiving device such as a Bluetooth/wireless receiver in a police station or car park, the device then automatically syncs the data downstream via (208) and (306) and clears its local storage of any video stored. Upon sync, the locally stored data may be transmitted to remote locations and be stored as raw video in a remote video storage (216), as meta data in a remote event storage log (218) or as a complete mirror of local storage in a remote storage (220) location such as Amazon S3.

Figure 4:
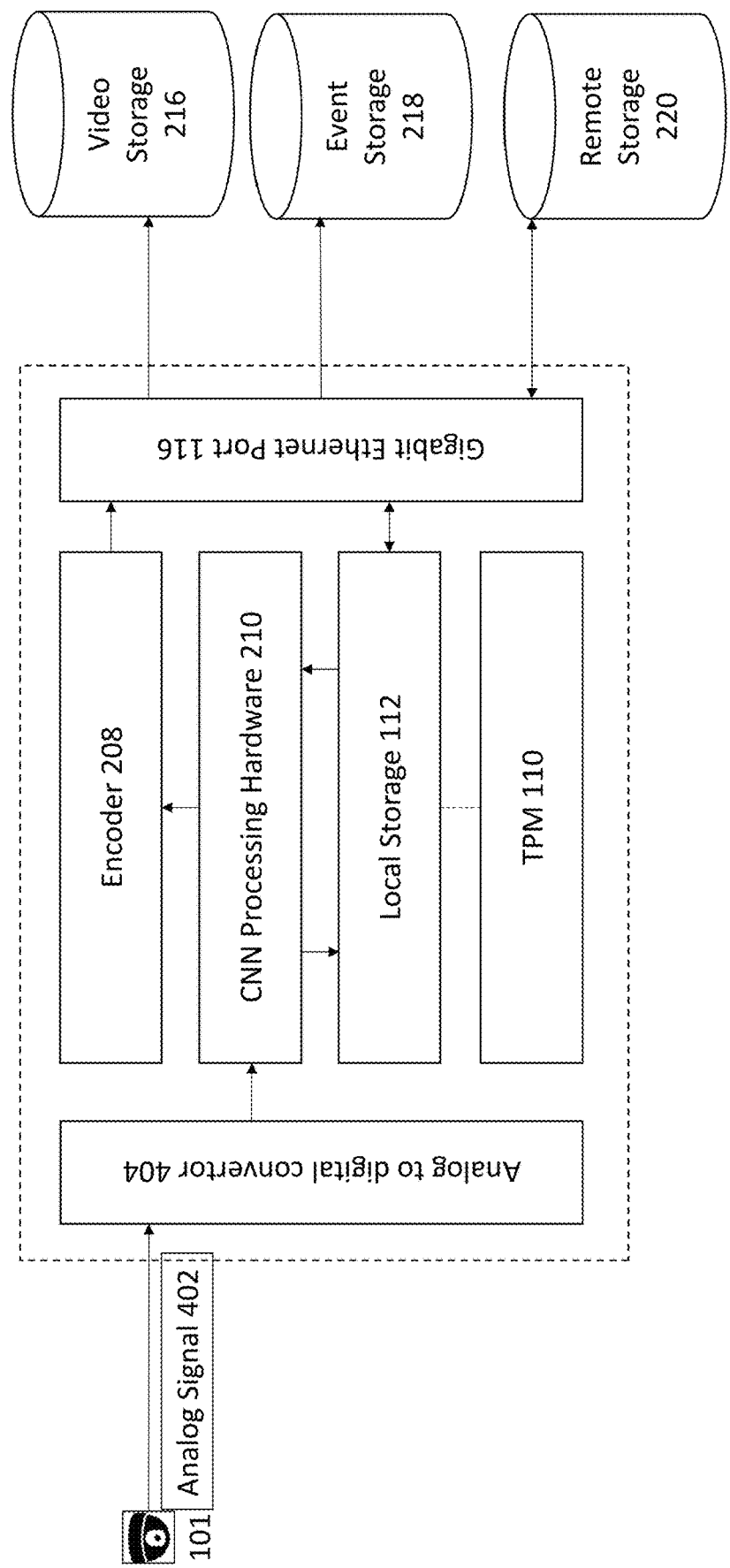
FIG. 4 shows an analogue signal being processed using the instant device, in one embodiment.

FIG. 4 shows a third embodiment of the present invention. In this embodiment the video stream may be an analogue signal transmitted over a co-axial cable. The signal is first converted to digital format via an analogue to digital convertor (404). The digital frame is then processed via (210) as previously discussed. Similar to previous embodiments, the annotated stream is re-encoded via (208) and is made available via (116) to downstream systems as in discussion on FIG. 3. As a special consequence of this embodiment, a previous generation analogue camera network may be converted to a modern Internet Protocol (IP) based network without replacing existing cameras.

In some embodiments, the camera may be housed in the same casing with the appliance and the appliance may be powered by a battery (also housed in the same casing). In some embodiments, the local storage (112) may act as the only form of storage and its contents (rules/object representations/archived video) may be made accessible via a mobile app or through another means of control.

In all embodiment, the local storage (112) may be encrypted with the encryption key stored in a secure key store such as the one provided by a Trusted Platform Module (110) which is implemented in hardware. This form of encrypted key storage ensures that the device is tamper proof as when any hardware modification takes place, the key cannot be retrieved from the TPM and thus the local storage (112) can never be decrypted.

In all embodiments where the appliance processes the stream from one camera, a different embodiment may include multiple input and output ports to support processing streams from multiple cameras.

Figure 5:
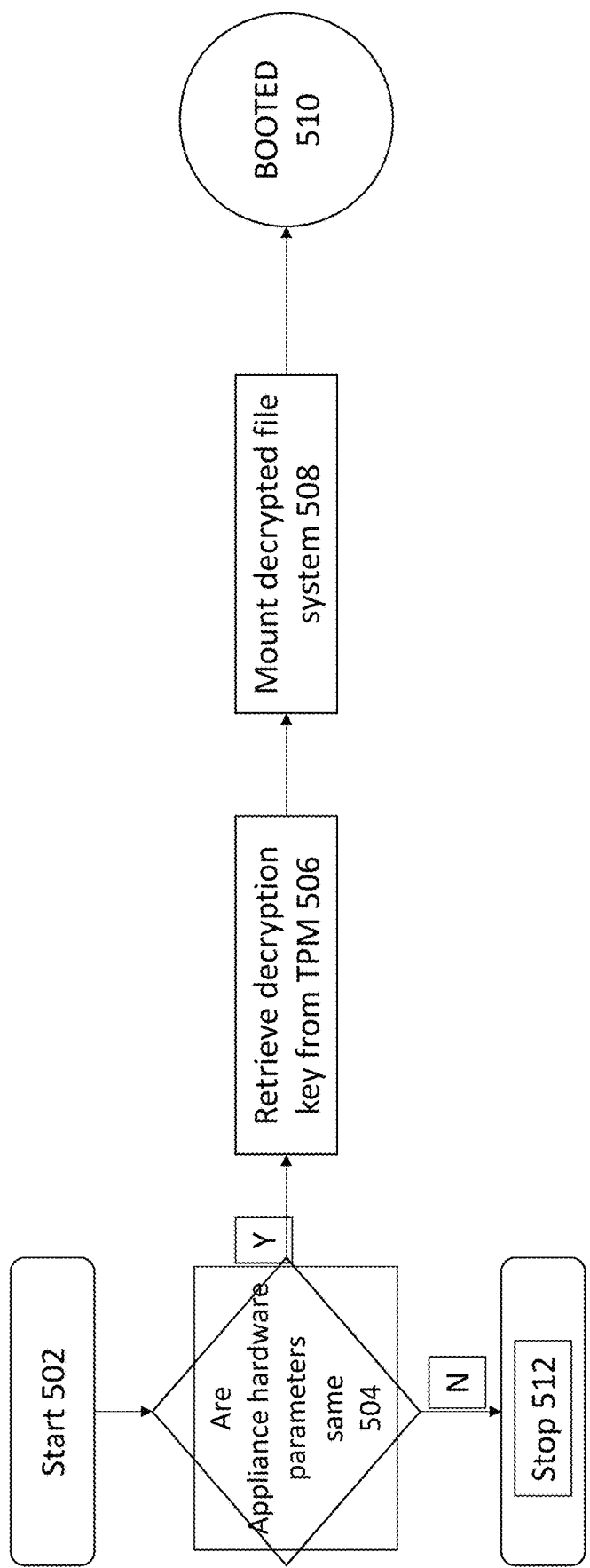
FIG. 5 shows the process of securely booting up the network switching appliance.

FIG. 5 shows the normal bootup operation of the appliance. Upon its start (502), the appliance checks to see if appliance hardware parameters are same or it has been tampered with (504). If the device has been tampered with (N), the device stops operating (512). If the device has not been tampered with (Y), the appliance retrieves its decryption key from the TPM (506). It then uses the decryption key to decrypt the encrypted disk partition containing the local storage (112) and mounts to the local file system (508). At this point the device has booted up successfully and is ready for operation (510).

Figure 6:
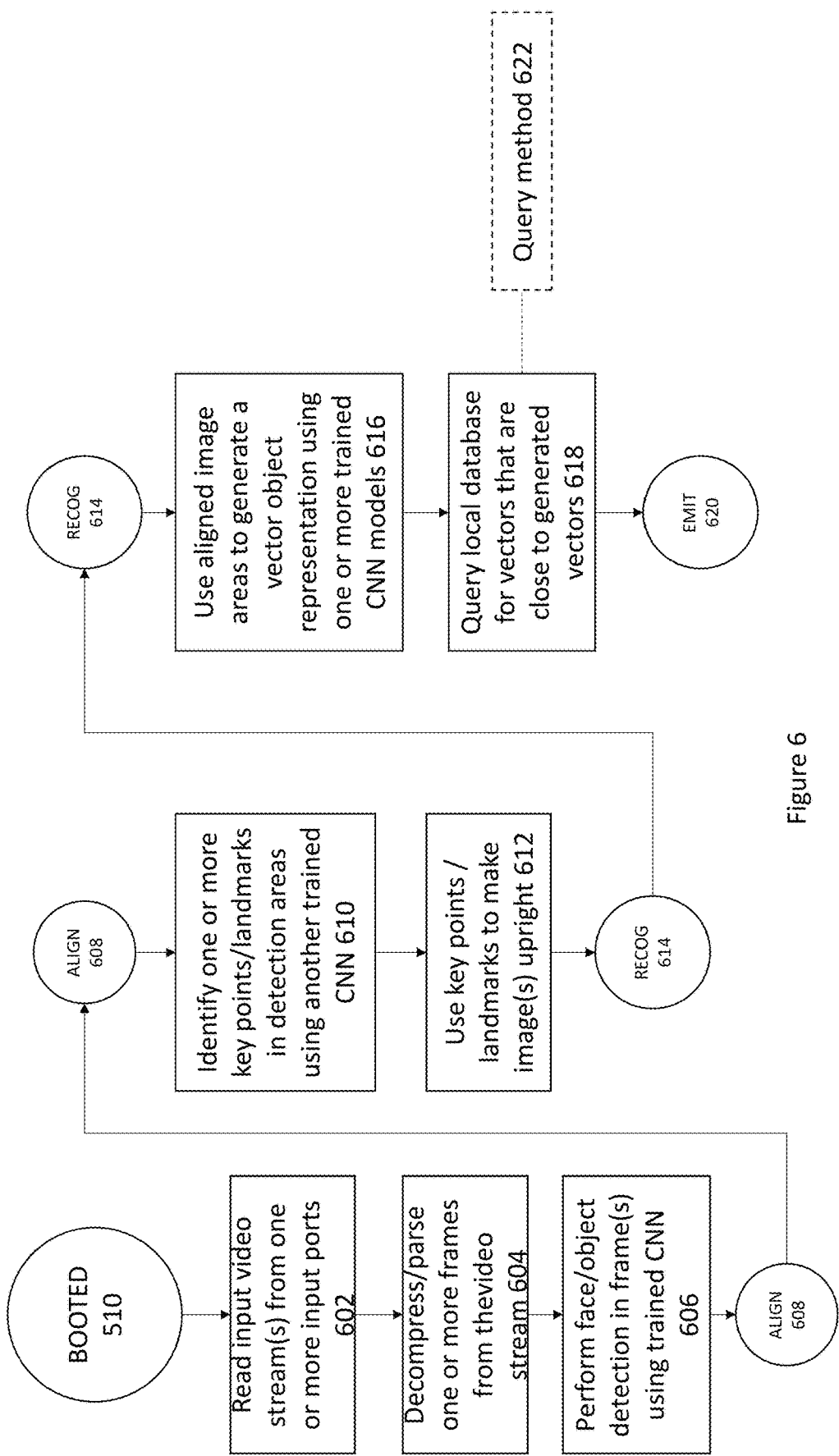
FIG. 6 shows the process of reading an input frame and querying the local database (present on local storage) to check if the image matches any person/objects of interest.

FIG. 6 shows the normal image processing and matching operations of the appliance. Once the device has booted up (510), it is ready for its normal operational state. In its normal operating state, the appliance reads input stream(s) from one or more input ports (602). The appliance then decompresses/parses one or more frames from the video stream (604). The appliance then uses a trained CNN running on a CNN hardware accelerator to detect faces/objects of interest in one or more frames (606). The regions of the image containing such faces/objects are then fed to a second CNN running on a hardware accelerator to detect key points/landmarks (610). The appliance then uses the detected key points/landmarks to translate, rotate or scale the regions of interest to make sure that the objects in those regions of interest are upright (612) a process that is called "alignment".

The aligned regions of interest are then fed to a third trained CNN running on a CNN hardware accelerator to generate vector representations of the faces/objects (616).

The appliance then uses the generated vector representations to perform a distance query on its local database stored in its local storage to find vectors stored in the local database that are close to the generated vectors from the video stream frame (618). Multiple models may be used in this process and a novel query method (622) is disclosed in FIG. 8. Once the query 618 step is finished the data is emitted 620.

Figure 7:
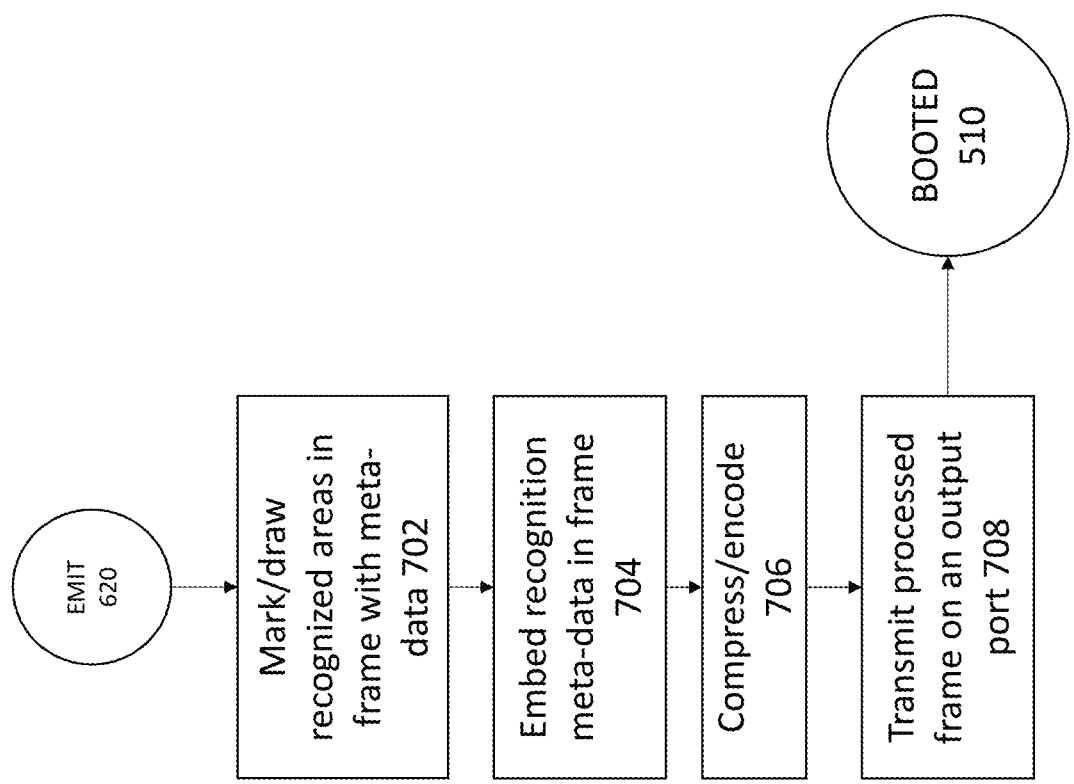
FIG. 7 shows the process of visually drawing meta-data on an input frame and emitting processed frame/meta-data via an output port.

FIG. 7 shows the final steps of operation of the appliance. If the vector representations of the regions of interest matched any stored vector representations in the local storage (618), the appliance marks the input frame with metadata such as a bounding box, and name (702). Furthermore, it may inject metadata such as detection time, detection location and detection type (type of object/identity of the person) into metadata locations in the stream or frame. It may also (optionally) generate an alert if the recognition matches some alert rules that the device may have defined in its local storage.

Finally the appliance compresses the annotated frame and metadata (706) and transmits the processed output on an output port (708). Following this step, the device can repeat all the steps described above for the next frame(s) in the video stream(s).

In the field of training Convolutional Neural Networks to recognize similar objects, often a technique is applied whereby the last layer of the network consists of n units with an activation function. The loss function is so constructed that the activation values from the last layer are treated as a co-ordinate in an n dimensional space and the loss function encourages the distance between coordinates from similar objects to be closer in this space whereas distance between coordinates belonging to dissimilar objects will be farther in the space.

Assuming there exist multiple models trained on same or different datasets that are trained for the same purpose, the present approach is to treat the results from each of these models as a distinct result which may contribute to the final result through a process of weighted voting.

As an example—model 1 has two votes. According to model 1 with two units in its last layer, object A represented by ($x_1$, $y_1$) and object B represented by ($x_2$, $y_2$) have a distance $$\sqrt{(x_1-x_2)^2+(y_1-y_2)^2} \qquad \text{Equation 2}$$

less than some threshold $T_1$ and thus model 1 predicts they are the same type of object.

Model 2 has 1 vote. According to model 2 with three units in its last layer, object A represented by $(a_1, b_1, c_1)$ and object B represented by $(a_2, b_2, c_2)$ have a distance $$\sqrt{(a_1-a_2)^2+(b_1-b_2)^2+(c_1-c_2)^2} \qquad \text{Equation 3}$$

greater than some threshold $T_2$ and thus model 2 predicts Object A and Object B are not the same type of object.

In the present approach, Model 1 has two votes which say the objects are of the same type, Model 2 has a single vote which says the objects are not of the same type. Thus, the conclusion is that the object is of the same type (two is to one).

While this ensemble voting method combines knowledge from both models, given that objects may be represented through multiple models, in the computation of the votes, multiple object representations must be stored and a lookup involves a nearest neighbor query for each model space—find the closest object to $(x_1, y_1)$ in Model 1 two dimensional space, then find the closest object to $(a_1, b_1, c_1)$ in Model 2 three dimensional space.

This increases the storage space required to store representations of objects from multiple models. It also increases the query time linearly with the use of multiple models.

The present invention proposes a method that combines multiple models through a concatenation of their representations. In the examples presented earlier, a representation from Model 1 $(x_1, y_1)$ when combined with a representation from Model 2 $(a_1, b_1, c_1)$ would be combined by this method to a 2+3 dimensional representation $(x_1, y_1, a_1, b_1, c_1)$.

This concatenated representation may then be stored in a single place and can be looked up with a single distance query. To demonstrate this, we start with the condition for Object A and B belonging to the same type according to the models. If object A and B are the same type, then according to model 1:

$$\sqrt{(x_1-x_2)^2+(y_1-y_2)^2} < T_1 \qquad \text{Equation 4}$$

Also, according to model 2:

$$\sqrt{(a_1-a_2)^2+(b_1-b_2)^2+(c_1-c_2)^2} < T_2 \qquad \text{Equation 5}$$

In both equations, we know that the left hand side and the right hand side of the inequality is positive. Therefore, when we square both equations and add them up, we get:

$$(x_1-x_2)^2+(y_1-y_2)^2+(a_1-a_2)^2+(b_1-b_2)^2+(c_1-c_2)^2 < T_1^2+T_2^2 \qquad \text{Equation 6}$$

Again, we know the left hand side and right hand side of the above is positive. Thus:

$$\sqrt{(x_1-x_2)^2+(y_1-y_2)^2+(a_1-a_2)^2+(b_1-b_2)^2+(c_1-c_2)^2} < \sqrt{T_1^2+T_2^2} \qquad \text{Equation 7}$$

But in the above equation, the left hand side represents the distance between two coordinates in a 2+3=5 dimensional space. That is, the left hand side is the distance between $(x_1, y_1, a_1, b_1, c_1)$ and $(x_2, y_2, a_2, b_2, c_2)$.

The same technique can be applied to an arbitrary number of spaces with an arbitrary number of dimensions. In the query method (622) disclosed in the present invention, N models are trained such that in each model there is a threshold $T_n$ which is the decision boundary for deciding whether two objects are of the same type. Then each model gives a representation coordinate for an object. We take the representation from each model and concatenate to form one large coordinate. The concatenated coordinate from all the models represents an object in the fully combined dimensionality on the N models. This coordinate can be stored efficiently and indexed. While querying to find all objects of the same type as A, we get the representation of A by concatenating all coordinates for A from each of the N models. Then we run a distance query for all stored objects that have a distance less than:

$$\sqrt{T_1^2+T_2^2+\ldots+T_n^2} \qquad \text{Equation 8}$$

This reduces the storage requirements for multiple indices and also results in a single distance query for multiple models.

Figure 8:
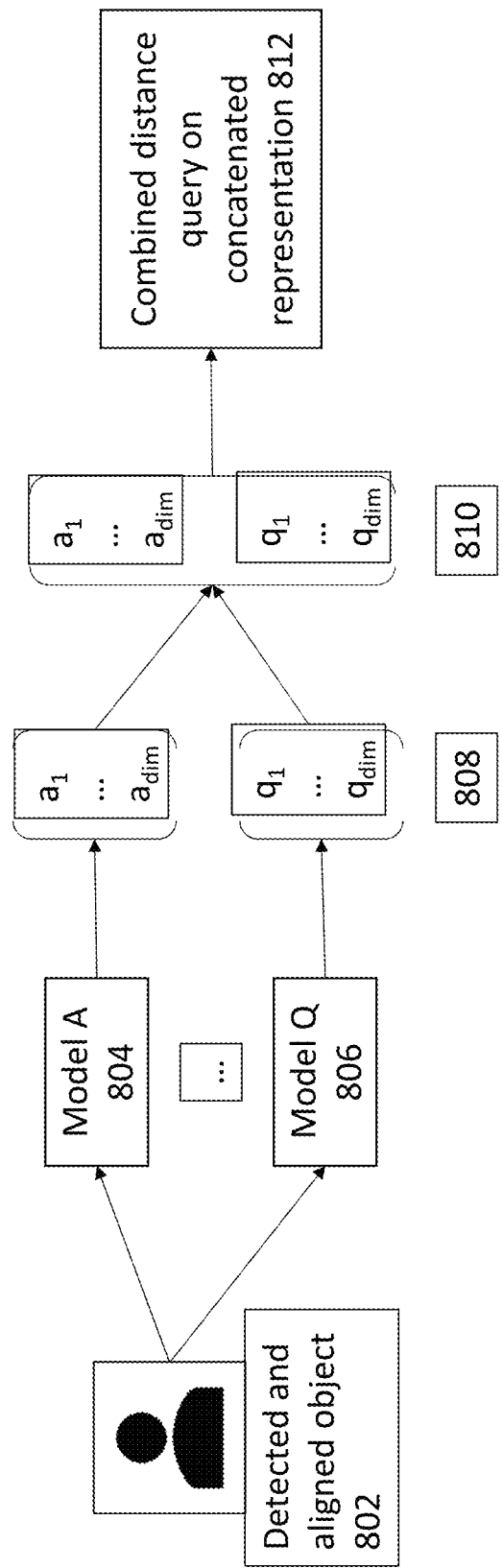
FIG. 8 shows how the vector representations generated by multiple models on detected images may be combined to perform a single distance query.

FIG. 8 shows the query method disclosed. The method starts with a detected and aligned region in a frame in an input stream (802). The region is then fed to multiple models A (804) to Q (806). Each of these models generates a vector representation according to the dimensionality of its last layer (808). These representations are then concatenated to form a combined query vector (810). A distance query is then performed to find stored vectors that are closer than the combined thresholds of the multiple models (812).

Figure 9:
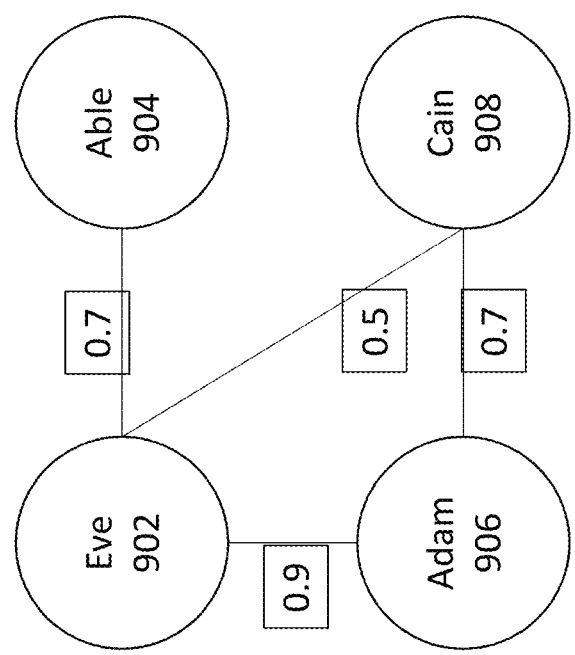
FIG. 9 shows a social graph that is constructed by analysing human interactions and associations.

FIG. 9 shows a social graph that can be constructed using a social graphing method disclosed in the present invention. In the graph, entities are represented by circles. The connections between entities is represented by lines. Each connection (line) also has an associated weight that represents the strength of the connection. In the figure, Eve (902) knows Adam (906), Able (904) and Cain (908). Adam knows only Eve and Cain. Able knows only Eve and Cain knows only Adam and Eve.

The number shown above the line connecting the persons is the strength of their connection. This weight (strength) increases when two people are seen together and decreases over time if they are not seen together for a while.

Figure 10:
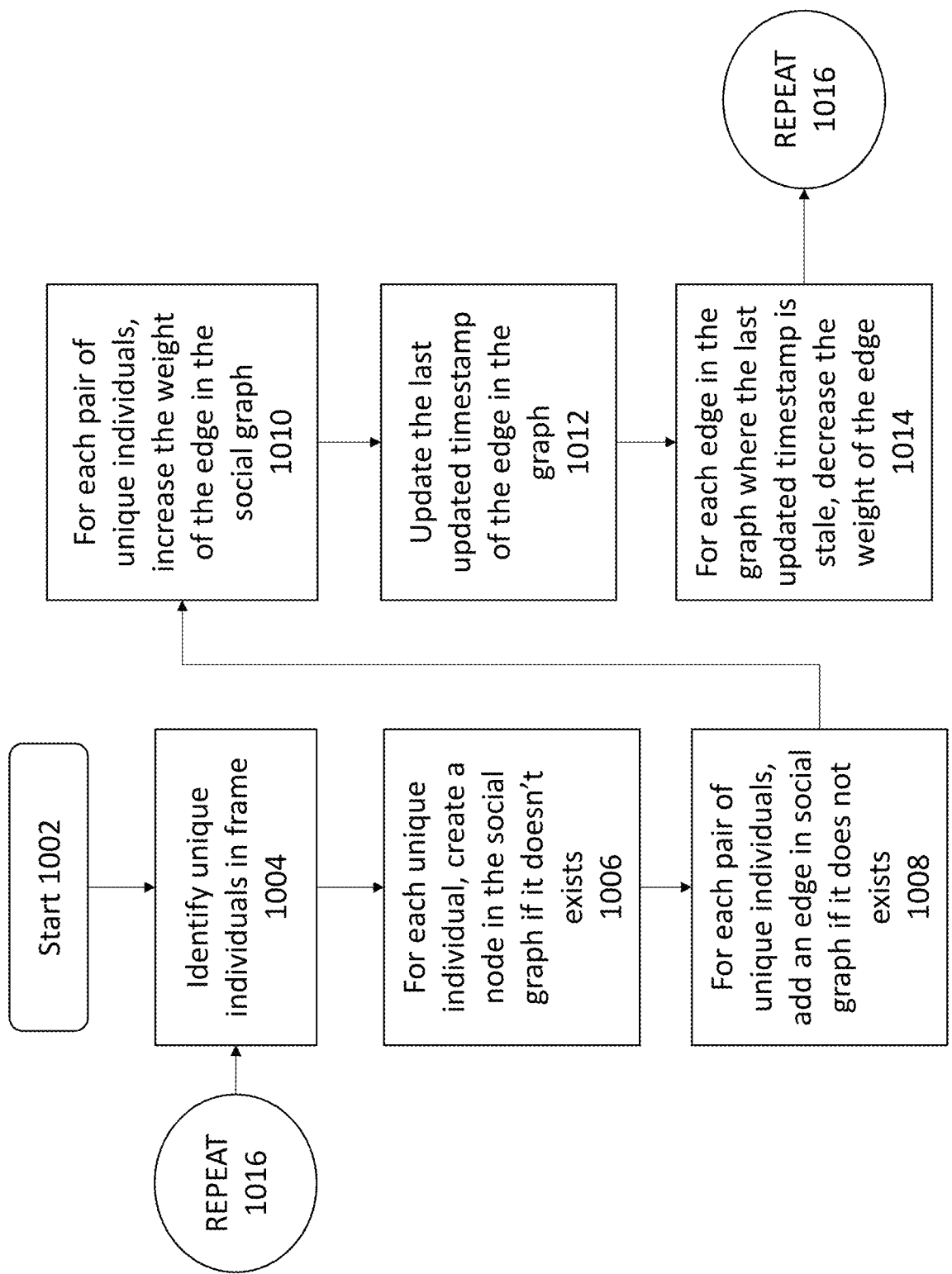
FIG. 10 shows the disclosed method of constructing and updating the social graph.

FIG. 10 shows the disclosed method of constructing and updating the social graph. The method starts (1002) by identifying unique faces/entities in a frame from a video stream (1004). For each unique individual entity, the method creates a node in a social graph if a node does not exist for that individual (1006). Then, the method adds an edge between the nodes of each pair of identified individuals if such an edge does not exist (1008). Furthermore, the method increases the weight of each edge between the nodes of each pair of identified individuals (1010). Next, the method updates the last updated timestamp for each edge between nodes of identified individuals (1012). Finally, the method decreases the weight of all edges in the graph that were not updated recently (1014). This process is repeated ad infinitum (1016).

Figure 11:
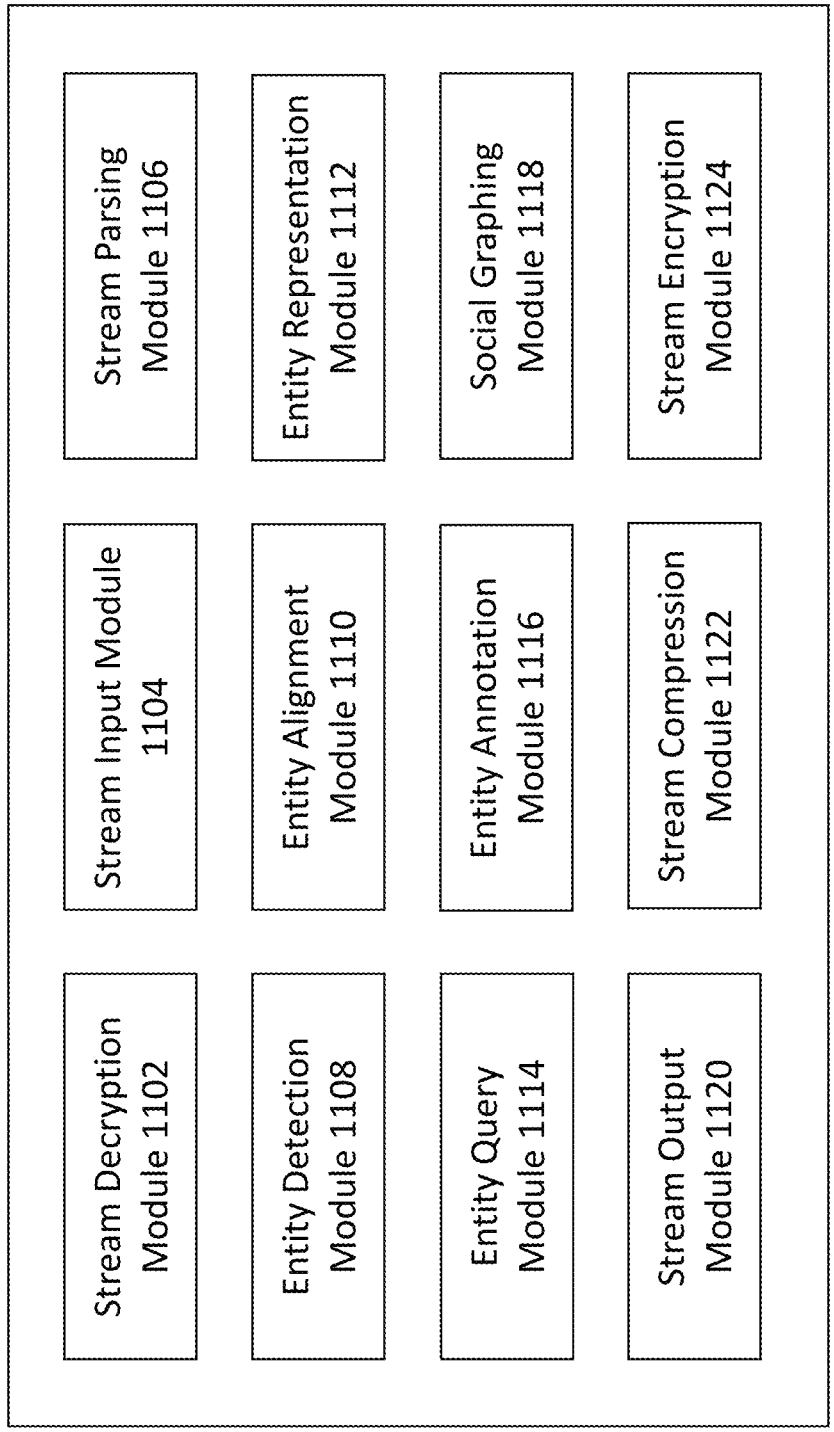
FIG. 11 shows a secure video stream analytics system.

FIG. 11 shows the disclosed system for secure video stream analytics (1100). The system is comprised of the following modules and use Equations 1-8 to compute results:

A Stream Decryption Module (1102) that decrypts a stream received on input port(s) (114) using decryption key(s) stored on the Trusted Platform Module (110). A Stream Input Module (1104) to receive the raw video stream from the Stream Decryption Module in form of a compressed/raw video stream for processing. A Stream Parsing Module (1106) decompresses/parses a raw video stream and performs any preprocessing operations on it such as resizing, cropping etc., using the software or hardware based Decoder (206). An Entity Detection Module (1108) that takes frames from one or more streams and performs Entity Detection to identify regions of interest in parallel using the CNN Processing Hardware (210).

An Entity Alignment Module (1110) that identifies key points/landmarks in regions of interest detected by 1108 and performs any affine transforms needed to make regions of interest upright. This module also uses a trained CNN Network executing on the CNN Processing Hardware (210) for this operation.

An Entity Representation Module (1112) that feeds aligned regions of interest through another CNN running on the CNN Processing Hardware (210) to obtain vector representations of the entities. An Entity Query Module (1114) that combines entity vector representations into a single query and finds matches for entities required to be matched from a local database stored on the encrypted local storage (112).

As a process the network switch appliance with its system performs an entity detection module to pass frames from one or more streams through a trained convolutional neural network executing on a convolutional neural network processing hardware to obtain regions of interest in the frames; an entity alignment module to process regions of interest obtained from an entity detection module and apply any affine transformations to them to make them upright by passing the regions of interest through a trained convolutional neural network executing on the convolutional neural network processing hardware to obtain keypoints/landmark locations; and an entity representation module to generate vector representations from aligned regions of interest obtained from an entity alignment module by passing the aligned regions of interest through a trained convolutional neural network executing on the convolutional neural network processing hardware to obtain high dimensional vector representations.

An Entity Annotation Module (1116) that uses matched entity metadata found by 1114 to draw bounding boxes and other metadata such as entity name or type on the frames received by 1106. A Social Graphing module (1118) that uses identity metadata to update the social graph in accordance with the method described in FIG. 10. The module stores local social graphs on the encrypted local storage for later merging with global social graphs when the device can connect to remote storage (220). A Stream Output Module (1120) caches output frames in a buffer for final compression and transmission. A Stream Compression Module (1122) that reads frames from 1120 and compresses them to a format suitable for communication or local storage. A Stream Encryption Module (1124) that creates the final encrypted packets for storage on 112 or for transmission through 116.

INDUSTRIAL APPLICATION

The network switching appliance may be used in networked surveillance and smart city solutions to identify and alert for the existence of (dangerous) matched individuals/objects in a video stream. While the embodiments described have been shown to process a single frame for purposes of matching known entities in the frame and creating annotation metadata, it can easily be extended to match a series of frames to identify actions or events.

The method of social graphing that is disclosed in the invention can be used for clustering groups of individuals that are close to each other (for example—who shop together in a retail outlet). Such clustering has many interesting applications such as the design of incentives and reward schemes, the identification of close unknown associates of a known terrorist etc.

What is claimed is:

1. A network switching appliance, comprising:
the network switching appliance with one or more USB/RJ45 ports which is connected to an image capturing device output port (USB/RJ45/HDMI) that connects to a downstream video management/viewing system to receive a rebroadcasted, compressed and annotated streams with meta data of a processed image at the network switching appliance having a convolutional neural network hardware;
wherein the network switching appliance performs the following tasks:
a secure device having one or more ports to receive a raw video stream from one or more image capturing devices;
a stream input module to receive the raw video stream from the decryption module in form of a compressed raw video stream for processing;
a stream parsing module to decompress the compressed raw video stream and produce an uncompressed raw video stream;
a secure video stream analytics system embedded in the secure device to process using network switching appliance locally and annotate the raw video stream to produce an annotated video stream with a meta data attached to it and performs object detection and matching tasks on a plurality of frames by querying a local database on the network switching appliance local storage;
a stream output module to caches output frames in a buffer for final compression and transmission;
a stream compression module that reads frames from a stream output module and compresses them to a format suitable for communication or local storage; and
a local storage device to store the annotated video stream to be retrieved for inspection or stored in a database when connected via an internet.

2. The network switching appliance of claim 1, further comprising;
a stream encryption module to secure the annotated video stream using an encryption key; and
a stream decryption module to manage a decryption key in a trusted platform module and to verify authenticity of the network switching appliance and expose the raw video stream for local processing and annotation.

3. The network switching appliance of claim 2, further comprising;
an entity detection module to pass frames from one or more streams through a trained convolutional neural network executing on a convolutional neural network processing hardware to obtain regions of interest in the frames;
an entity alignment module to process regions of interest obtained from an entity detection module and apply any affine transformations to them to make them upright by passing the regions of interest through a trained convolutional neural network executing on the convolutional neural network processing hardware to obtain keypoints/landmark locations; and
an entity representation module to generate vector representations from aligned regions of interest obtained from an entity alignment module by passing the aligned regions of interest through a trained convolutional neural network executing on the convolutional neural network processing hardware to obtain high dimensional vector representations.

4. The network switching appliance of claim 3, further comprising;
an entity query module to generate a concatenated vector representations from multiple models and find similar vectors by querying a single index in a database present on the local storage.

5. The network switching appliance of claim 4, further comprising;
an entity annotation module to mark/draw entity metadata information on input frames.

6. The network switching appliance of claim 5, further comprising;
a social graphing module to construct and update local social graphs stored in the local storage and to transmit/sync them to a remote storage for global merge when the appliance can connect to the remote storage.

7. A process of using a network switching appliance for a streaming video analytics, comprising;
capturing a raw video stream from an image device through a distinct input port located at the network switching appliance on one end;
receiving from a stream input module the raw video stream from the stream decryption module in form of a compressed raw video stream for processing;
decompressing the compressed raw video stream and produce an uncompressed raw video stream using a stream parsing module; and
performing a multiple object detections simultaneously using a convolutional neural network algorithm using a trained model executing on a convolutional neural network processing hardware and using the entity detection module;
annotating the raw video stream using a secure video stream analytics system embedded in the appliance to locally process, perform object detection and matching tasks on a plurality of frames by querying a local database on the network switching appliance local storage and produce an annotated video stream with a meta data attached to it; and
retrieving the annotated video stream for inspection or storing in a database when connected via an internet through the output port of network switching appliance.

8. The process of claim 7, further comprising;
securing the annotated video stream using an encryption key residing in a trusted platform module; and
verifying authenticity using a decryption key residing in the trusted platform module to verify authenticity of the network switching appliance and expose the raw video stream for local processing and annotation.

9. The process of claim 8, further comprising;
detecting of a key point and landmark for an image alignment using the entity alignment module and using the detected key points to make detections upright.

10. The process of claim 9, further comprising;
generation of high dimensional vector representations using the entity representation module.

11. The process of claim 10, further comprising;
querying concatenated vector representations using the entity query module and generating annotated video stream frames using entity annotation module.

12. The process of claim 11, further comprising;
constructing a social graph using the social graphing module and using the social graphing algorithm shown in FIG. 10.

13. The process of claim 12, further comprising;
buffering/caching video stream frames via the stream output module, compressing the processed and annotated video stream frames for storage or downstream communication via the stream compression module, and finally, encrypting the stream for storage or downstream consumption using the stream encryption module.

* * * * *